(12) United States Patent
Ellis et al.

(10) Patent No.: US 9,506,634 B1
(45) Date of Patent: Nov. 29, 2016

(54) LAMP STRUCTURES AND METHODS FOR MOUNTING THE SAME

(71) Applicant: RGF ENVIRONMENTAL GROUP, INC., Riviera Beach, FL (US)

(72) Inventors: Walter B. Ellis, Jupiter, FL (US); Sergei Chtchavelev, Greenacres, FL (US)

(73) Assignee: RGF ENVIRONMENTAL GROUP, INC., Riviera Beach, FL (US)

( * ) Notice: Subject to any disclaimer, the term of this patent is extended or adjusted under 35 U.S.C. 154(b) by 0 days.

(21) Appl. No.: 14/839,142

(22) Filed: Aug. 28, 2015

(51) Int. Cl.
| | |
|---|---|
| *F21V 19/00* | (2006.01) |
| *F21S 8/00* | (2006.01) |
| *F21V 33/00* | (2006.01) |
| *F24F 3/16* | (2006.01) |
| *B01J 19/12* | (2006.01) |

(52) U.S. Cl.
CPC .............. *F21V 19/008* (2013.01); *F21S 8/036* (2013.01); *B01J 19/123* (2013.01); *F21V 33/006* (2013.01); *F21V 33/0088* (2013.01); *F24F 2003/1667* (2013.01)

(58) Field of Classification Search
CPC ............. F21V 19/008; F21V 19/0015; F21V 33/006; F21V 33/0088; A61L 2/10; A61L 9/20; F24F 2003/1667; F21S 8/00; F21S 8/03; F21S 8/033; F21S 8/036; B01J 19/123
See application file for complete search history.

(56) References Cited

U.S. PATENT DOCUMENTS

| | | | |
|---|---|---|---|
| 5,894,130 A * | 4/1999 | Bach .......................... | A61L 2/10 250/436 |
| 5,902,552 A * | 5/1999 | Brickley .................... | A61L 2/10 250/455.11 |
| 6,797,966 B2 * | 9/2004 | Summers ................... | A61L 2/08 250/436 |
| 7,704,463 B2 | 4/2010 | Willette | |
| 9,035,270 B2 * | 5/2015 | Graebel ..................... | F24F 7/04 250/436 |
| 2005/0163653 A1 * | 7/2005 | Crawford ................... | A61L 2/10 422/24 |

* cited by examiner

*Primary Examiner* — Jack Berman
(74) *Attorney, Agent, or Firm* — Rothwell, Figg, Ernst & Manbeck, P.C.

(57) ABSTRACT

Described herein are devices and methods for mounting a lamp, wherein the lamp may include a light and a mounting assembly that may be configured to enable a quick release installation of the light. The light may be a UV light, and the light may be mounted to an external or an internal surface of an HVAC unit via a mounting assembly which may include a bracket, a mounting base, and/or a socket. The base and socket may have complementary engagement structures that allow the base to engage the socket from either of a first axial direction and a second axial direction.

55 Claims, 11 Drawing Sheets

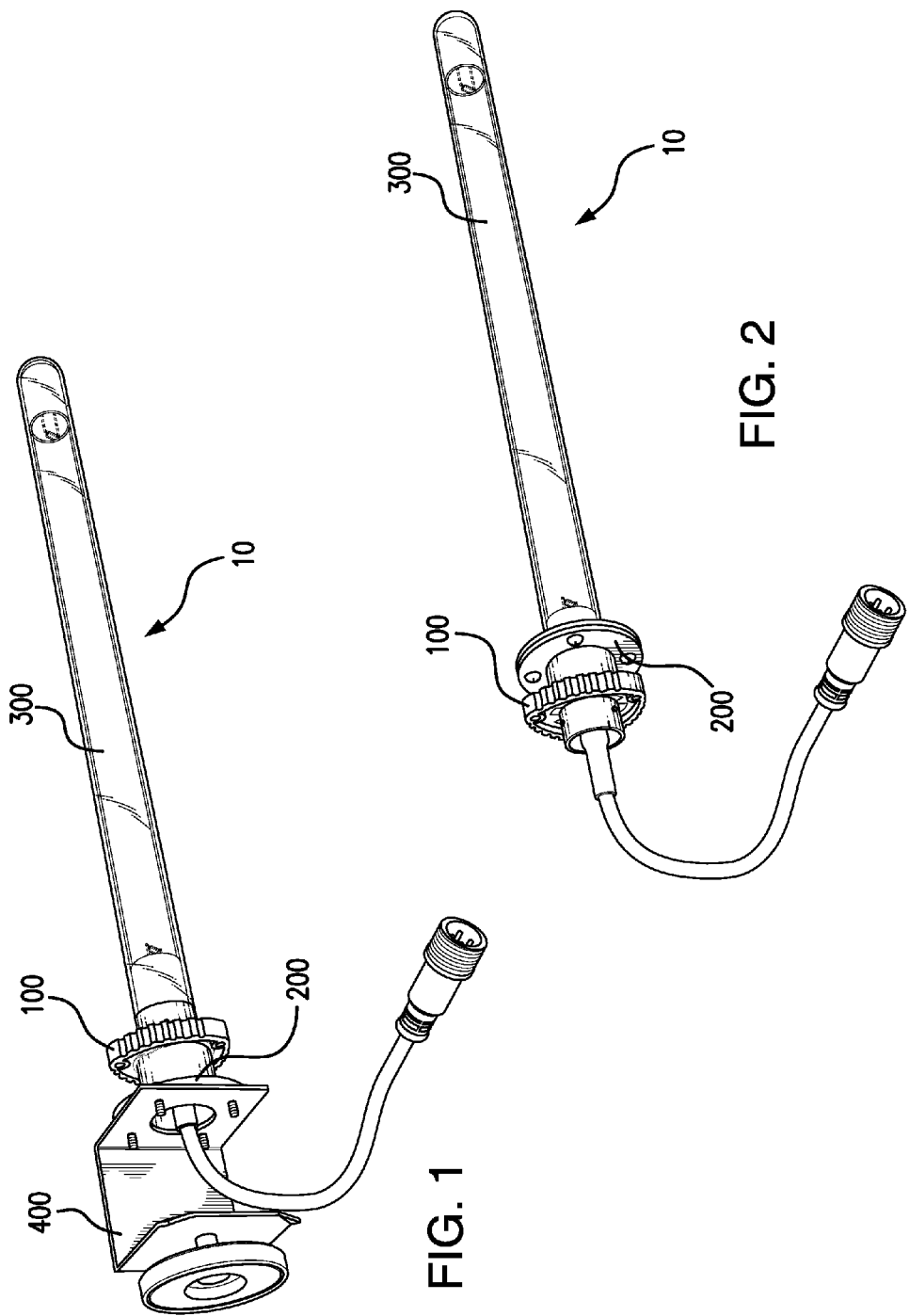

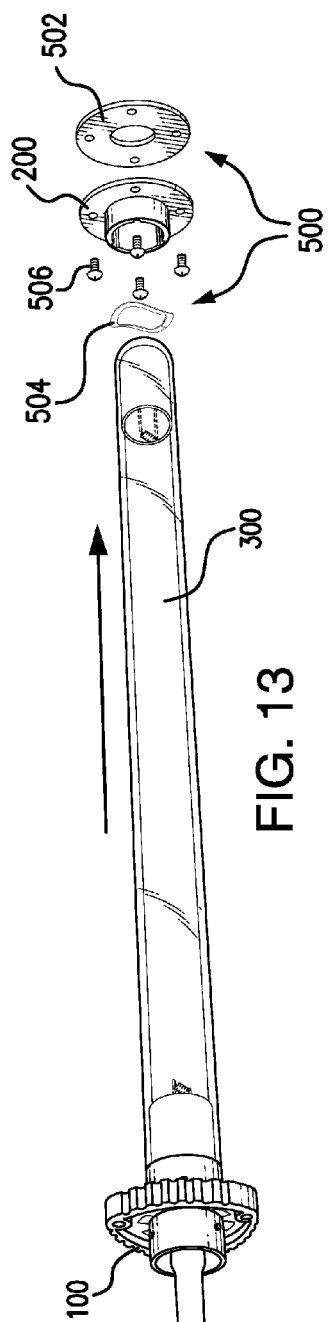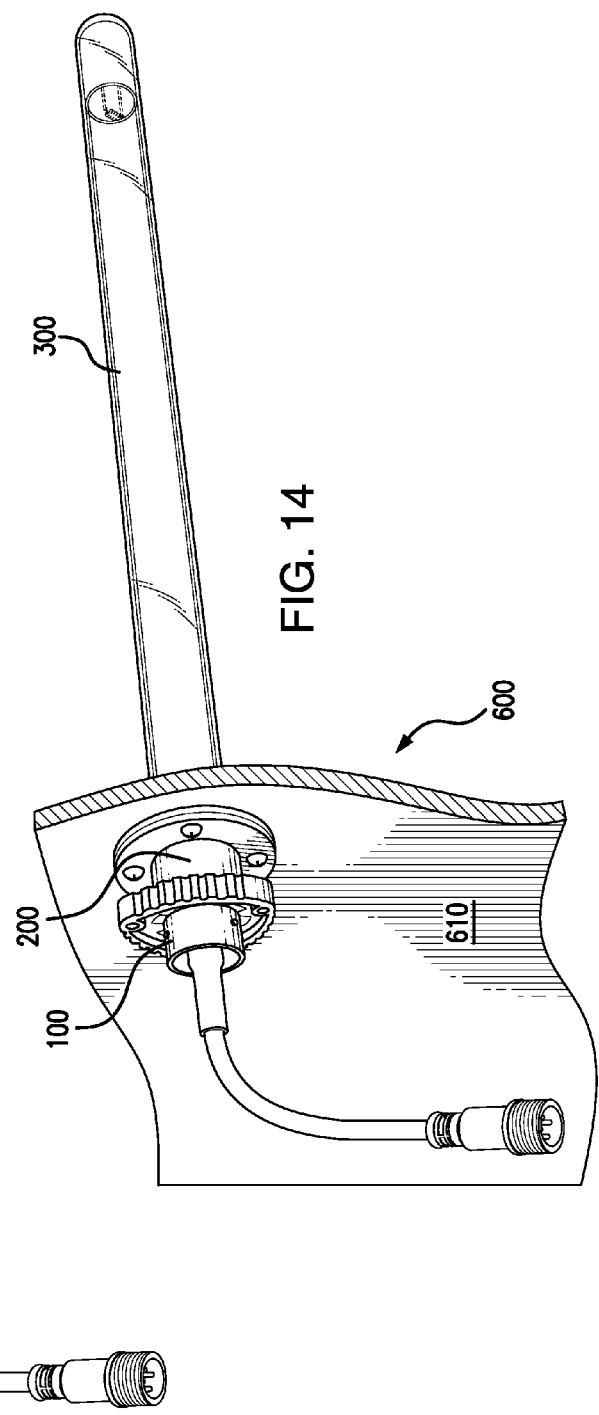

LAMP STRUCTURES AND METHODS FOR MOUNTING THE SAME

TECHNICAL FIELD

The disclosure relates generally to devices and methods for mounting ultraviolet (UV) lights in order to treat moving air and/or stationary surfaces in a heating, ventilation, and air conditioning unit (HVAC unit). More particularly, the invention provides devices and methods wherein a lamp including a UV light may be mounted to an external or internal surface of an HVAC unit via a bracket, a mounting base, and/or a socket. The disclosed devices and methods may be used to sterilize moving air and/or stationary surfaces in an HVAC unit, thereby inactivating microorganisms such as viruses and bacteria and improving air quality in an environment.

BACKGROUND

Contamination of static surfaces and moving air within an HVAC unit is a common problem that may significantly deteriorate air quality within an environment. For example, organic growth within an HVAC unit may increase the risk of disease for persons occupying a building such as a personal residence, an office building, a factory, or the like.

Germicidal UV light rays can be used for inactivating microorganisms such as viruses and bacteria disposed on surfaces of an HVAC unit and within air moving through an HVAC unit. This may be accomplished by installing one or more so-called UV "stick" lights directly within an HVAC unit. Such UV "stick" lights are primarily used to treat stationary surfaces but may also be sized to sterilize particles in moving air.

Such UV lights may thus be mounted in such a manner as to project UV radiation onto surfaces and moving air within an interior chamber of an HVAC unit. This may be accomplished by mounting a UV light to an internal surface of an HVAC unit, or may alternatively be accomplished by inserting a UV light through an outer wall of an HVAC unit and mounting the UV light therein.

Installation of such UV lights into existing HVAC systems tends to be a difficult and time consuming process. In most cases, especially given the available lamp structures and mounting mechanisms, installation is difficult and slow to perform and may require substantial use of tools. The same holds true even for routine replacements.

There exists a need in the art, therefore, for a device and method that allows a UV light or other lamp structure to be installed, removed, and replaced quickly and efficiently, with minimal, if any, use of tools.

SUMMARY

The devices and methods disclosed herein provide for a light to be quickly installed, removed, and replaced from a mounting position such as on or within an HVAC unit. The devices and methods employ a socket for receiving a lamp. The socket may have first and second socket portions such that either of the first and second socket portions may engage or be engaged by a mounting base. The devices and methods disclosed herein utilize a quick release system, employing a socket for receiving a light and a quick release mounting base, wherein the base is configured to releasably engage the light from either of an external mounting direction and an internal mounting direction. The disclosed systems and methods thereby allow a light to be quickly installed, removed, and/or replaced, and in some embodiments, these steps may be performed by hand, without the use of tools.

In accordance with some embodiments, a lamp may comprise a mounting assembly for mounting a light. The mounting assembly may comprise a socket having a first socket portion and a second socket portion, and the first socket portion may be configured to receive a portion of a light. The mounting assembly may further comprise a mounting base having a first engagement structure and a second engagement structure. The first engagement structure may be configured to engage either of the first socket portion and the second socket portion, and the second engagement structure may be configured to engage a surface to which the base may be mounted.

In accordance with other embodiments, a lamp may comprise a socket having a first socket portion and a second socket portion. The first socket portion may be configured to receive a portion of a light. A first engagement structure may be disposed on the first socket portion, and the first engagement structure may be configured to engage a mounting base. A second engagement structure may be disposed on the second socket portion, and the second engagement structure may be configured to engage a mounting base.

In accordance with other embodiments, a method for mounting a light may be provided. The method may comprise steps such as providing a socket having a first socket portion and a second socket portion, the first socket portion being configured to receive a portion of the light. The method may further comprise steps such as providing a mounting base having a first engagement structure and a second engagement structure, the first engagement structure being configured to engage either of the first socket portion and the second socket portion, and the second engagement structure being configured to engage a mounting surface to which the base may be mounted. The method may further comprise steps such as using the first engagement structure to engage the socket, and using the second engagement structure to affix the base to the mounting surface.

BRIEF DESCRIPTION OF THE FIGURES

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein.

FIG. 1 illustrates an exemplary mounting assembly for a UV light wherein a socket is engaged to a mounting base in an internal installation configuration.

FIG. 2 illustrates an exemplary mounting assembly for a UV light wherein a socket is engaged to a mounting base in an external installation configuration.

FIG. 13 illustrates a first exemplary installation configuration wherein a light is being inserted into a base from a first direction.

FIG. 14 illustrates the first exemplary installation configuration of FIG. 13, wherein the light has been inserted into the base from the first direction, and the base is mounted to a surface of an HVAC unit.

DETAILED DESCRIPTION

Figure 3:
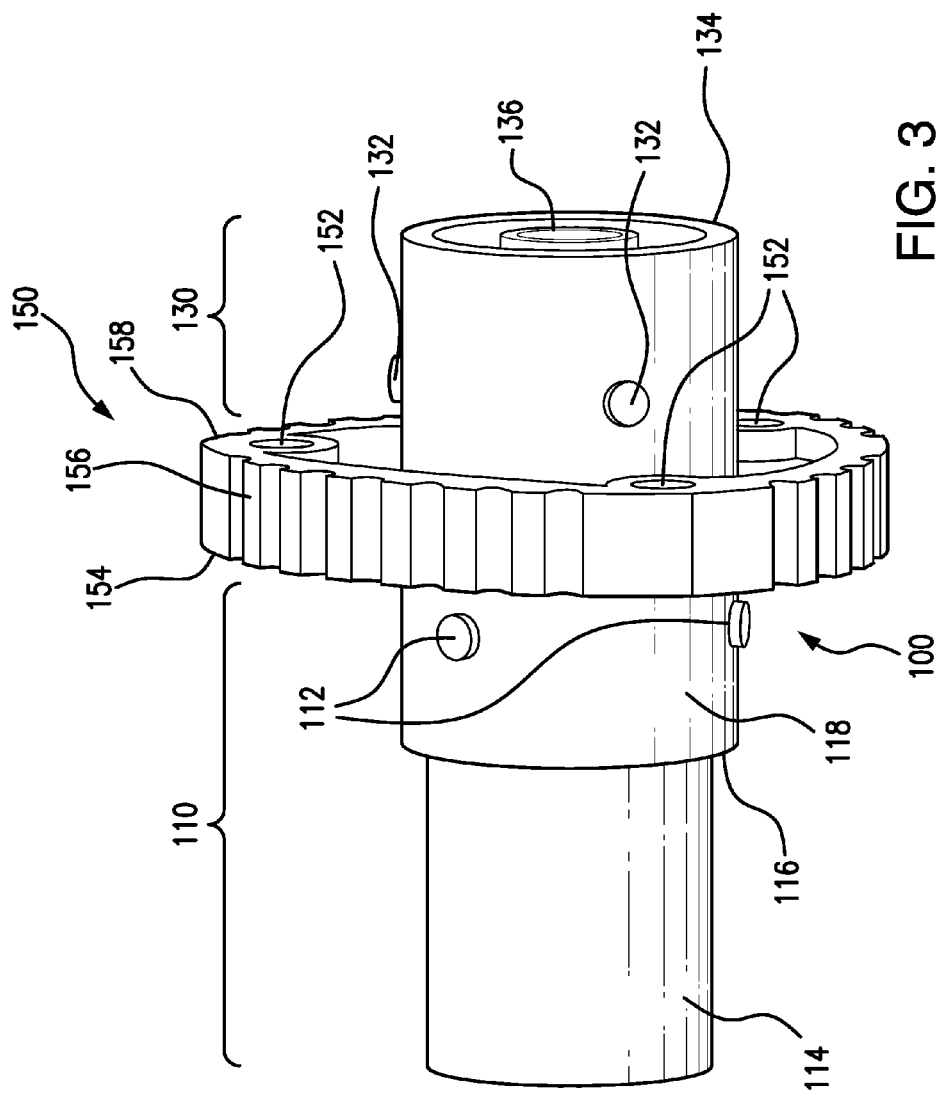
FIG. 3 illustrates a first view of an exemplary socket.

This disclosure relates generally to devices and methods for mounting lamp structures in order to treat moving air and/or stationary surfaces in an HVAC unit. As used herein, the term HVAC unit encompasses any system that may be used to regulate, control or influence the heating, ventilation, and/or air conditioning of one or more environments.

FIGS. 1 and 2 illustrate a lamp 10 assembled according to exemplary embodiments. FIG. 1 depicts the lamp 10 assembled according to an internal installation configuration. FIG. 2 depicts the lamp 10 assembled according to an external installation configuration. In either of the above installation configurations, the lamp 10 may comprise a socket 100, a mounting base 200, and a light 300. As illustrated in FIG. 1, in which the lamp 10 is assembled according to an internal installation configuration, the lamp 10 may further comprise a bracket 400. The lamp 10 may further include assembly hardware such as a sealing flange 502, a tension washer 504, and one or more screws 506 (shown in FIGS. 13 and 16).

In the exemplary internal installation configuration illustrated in FIG. 1, the mounting base 200 may be coupled to a mounting surface of a bracket 400 which may comprise a U-shaped bracket 400. The bracket 400 in turn may be coupled to an external surface (shown in FIGS. 14 and 15) or an internal surface of an HVAC unit 600 (shown in FIG. 17) by way of a bracket coupling member such as a magnet, a tape pad comprising an adhesive, and/or one or more screws. The base 200 may comprise a quick release connector that is configured to releasably engage the socket 100, which may in turn, engage the light 300.

Thus, when assembling the lamp according to an internal installation configuration, a user may mount the bracket 400 and the base 200 to an internal surface of an HVAC unit. Thereafter, a light 300 coupled to a front portion of a socket 100 may be quickly installed within the HVAC unit by simply inserting a rear portion of the socket 100 within the base 200 and rotating the socket 100 relative to the base. When a user wishes to replace the light 300, the light 300 may be pushed down along its long axis to disengage a front engagement structure 112 of the socket from an engagement structure 212 of the base 200, then rotated and withdrawn from the base 200. Similarly, a new light 300 and socket 100 may be engaged to the base 200. Exemplary internal installation configurations are explained in greater detail below with reference to FIGS. 16-17.

In the exemplary external installation configuration illustrated in FIG. 2, a hole may be drilled through an external surface of an HVAC unit, and the mounting base 200 may be affixed to the external surface of the HVAC unit such that that a hollow passage within the mounting base 200 aligns with the drilled hole. Thereafter, a light 300 coupled to a front portion of a socket 100 may be quickly installed within the HVAC unit by simply inserting the body of the light 300 through the drilled hole and the hollow passage of the base 200 such that the front portion of the socket 100 is inserted within the base 200. Engagement between the base 200 and socket 100 may then be effected by rotating the socket 100 relative to the base 200. When a user wishes to replace the light 300, the light 300 and socket 100 may be simply rotated in the opposite direction and withdrawn, and a new light 300 and socket 100 may be engaged to the base 200. Exemplary external installation configurations are explained in greater detail below with reference to FIGS. 13-15.

Figure 4:
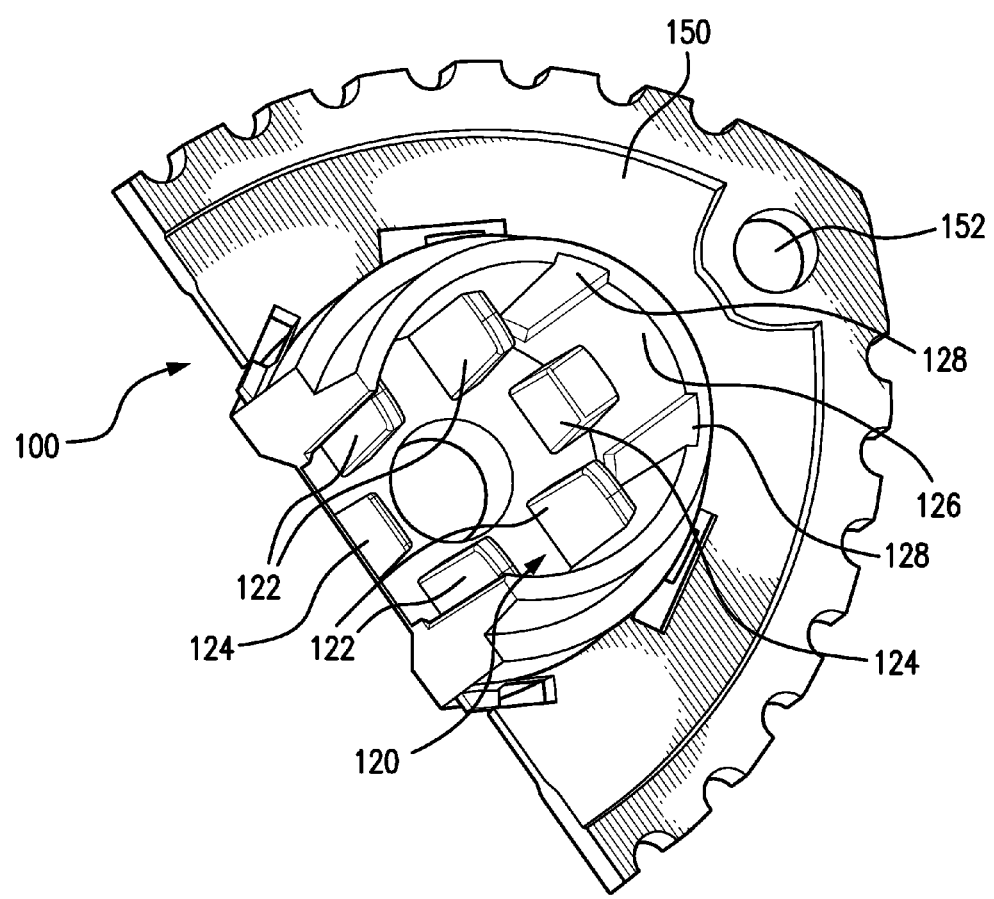
FIG. 4 illustrates a cutaway view of an exemplary socket.

As illustrated in FIGS. 3 and 4, a socket 100 according to an exemplary embodiment may comprise a front socket portion 110, a rear socket portion 130, and a radial flange 150 that may be disposed between the front socket portion 110 and the rear socket portion 130. The front socket portion 110 and rear socket portion 130 may each comprise elongate bodies having a cross-sectional size or diameter. In one embodiment, the front socket portion 110 and the rear socket portion 130 may comprise substantially cylindrical structures having substantially circular cross-sectional shapes. In alternative embodiments, the front and/or rear socket portions 110, 130 may comprise other cross-sectional shapes such as an oval cross-sectional shape, a rectangular cross-sectional shape, a triangular cross-sectional shape, or other cross-sectional shapes as may be envisioned by those of skill in the art.

The front socket portion 110 may comprise a front engagement structure 112. The front engagement structure 112 may comprise a set of one or more protrusions that are configured to engage a complementary engagement structure 212 disposed on or within a mounting base 200 (shown in FIG. 5). The front socket portion 110 may further comprise a first axial portion 114 and a second axial portion 118. The first axial portion 114 and the second axial portion 118 may have different sizes or diameters. For example, the first axial portion 114 may have a diameter that is less than a corresponding diameter of the second axial portion 118. A transverse surface 116 may be disposed between the first and second axial portions 114, 118 such that the transverse surface 116 divides the first axial portion 114 from the second axial portion 118. In one embodiment, the transverse surface 116 may extend in a plane that is substantially perpendicular to a longitudinal axis of the socket 100. In other embodiments, the transverse surface 116 may extend at transverse angles relative to the longitudinal axis of the socket 100.

The rear socket portion 130 may comprise a rear engagement structure 132. Like the front engagement structure 112, the rear engagement structure 132 may comprise a set of one or more protrusions that are configured to engage a complementary engagement structure 212 disposed on or within a mounting base 200 (shown in FIG. 5). In an exemplary embodiment, the front engagement structure 112 and the rear engagement structure 132 are equivalent engagement structures such that the socket 100 is configured to engage a single mounting base 200 from either of a first frontal direction and a second rearward direction that is axially opposite the first direction.

The rear socket portion 130 may comprise an outer member 134 and an inner member 136. The outer member 134 may comprise an outer tube 134 and the inner member 136 may comprise an exit tube 136 which may be arranged for passage of electrical wires. When a light 300 is retained by the front socket portion 110, power may be delivered to the light 300 via wires (not shown) that extend through the exit tube 136. In some embodiments, a shrink tube may be provided within the exit tube 136 to thereby seal the wiring directly into the exit tube 136. In other embodiments, a portion of the exit tube 136 may comprise a shrink tube that seals the wiring within the socket 100.

Figure 5:
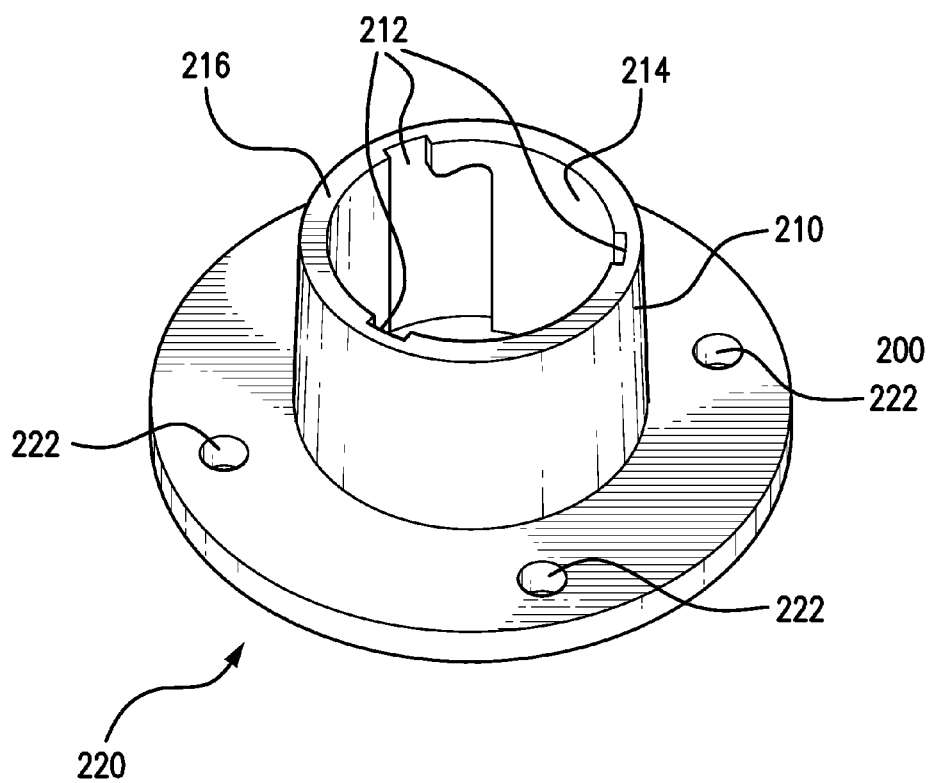
FIG. 5 illustrates an exemplary mounting base.

The outer member 134 may have a size and shape that is substantially equivalent to the size and shape of the second axial portion 118. Accordingly, the rear socket portion 130 and the second axial portion 118 may be configured to engage a single mounting base 200 which, as illustrated in FIG. 5, may define a receiving space having a size and shape that is complementary to that of the rear socket portion 130 and the second axial portion 118 of the front socket portion 110. In some embodiments, the outer member 134 and the second axial portion 118 may each define cylinders having outer diameters, wherein the outer diameter of the outer member 134 is substantially equal to the outer diameter of the second axial portion 118. Likewise, the mounting base 200 may define a receiving space having an inner diameter, and the inner diameter of the receiving space may be substantially equal to the outer diameter of the outer member 134 and the second axial portion 118. Thus, an air- and water-tight seal between the socket 100 and the base 200 may be achieved when either of the first socket portion 110 (in particular, the second axial portion 118 of the socket portion 110) or the second socket portion 130 are engaged within the base 200. In some embodiments, the inner diameter of the base receiving space may be slightly smaller than the outer diameter of the second axial portion 118 and the second socket portion 130 so that the components must resiliently deform in order to engage one-another, thereby helping to ensure an air- and water-tight seal. In some embodiments, the seal between the base 200 and socket 100 is formed in two places. In some embodiments, one seal is formed between the second axial portion 118 of socket 100 and the inner surface 214 of base 200. In some embodiments, a sealing flange 502 (shown in FIG. 13) can be used to form a second seal. The inner diameter of the sealing flange 502 can be slightly less than the diameter of the second axial portion 118 of socket 100 (and the outer diameter of lamp 300) to form a second air- and water-tight seal.

The socket 100 may further comprise a radial flange 150. The flange 150 may project radially outwardly in a plane that is substantially perpendicular to a longitudinal axis of the socket 100. In other embodiments, the flange 150 may extend at one or more angles that are transverse to the longitudinal axis of the socket 100. The flange may include a front surface 154, a rear surface 158, and a circumferential surface 156. As illustrated in FIGS. 1, 2, and 5, the front surface 154 of the flange may abut an end surface 216 of a mounting base 200 when the front socket portion 110 is engaged to the base 200. Likewise, the rear surface 158 of the flange may abut the end surface 216 of the base 200 when the rear socket portion 130 is engaged to the base 200. In some embodiments, a sealing flange 502 can fit onto radial flange 150. When socket 100 is engaged with base 200, the sealing flange 502 can act as a tensioner and create a seal between radial flange 150 and end surface 216 of base 200.

The circumferential surface 156 may comprise a knurled or textured surface, which may aid in gripping the socket 100 for rotation thereof during installation or removal of the socket 100 from a mounting base 200. As illustrated in FIGS. 3 and 4, the flange 150 may comprise a flange engagement structure 152 which may comprise a set of one or more holes that are arranged to receive screws therethrough. The flange 150 may define a rounded triangular shape having three points, wherein an element (such as a hole) of the flange engagement structure 152 is disposed at each of the three points.

The socket 100 may comprise a light retention structure 120 as illustrated in FIG. 4. As will be explained in greater detail with reference to FIGS. 8 and 9, the light retention structure may be arranged on or within the first socket portion 110 and may comprise hollow receiving space that is sized and shaped to receive a portion of a light 300. The light retention structure 120 may comprise a tube having an inner surface 126 with an inner diameter that is substantially equal to an outer diameter of a light 300 to thereby engage and support the body of the light 300 when the light 300 is received by the light retention structure 120. The inner surface 126 may further comprise one or more axial slots 128 that may be sized and shaped to accommodate wires (not shown) protruding from the end of a light 300. In some embodiments, the wires are covered with polytetrafluoroethylene to prevent heat and/or UV damage.

The light retention structure 120 may further comprise a first set of surfaces 122 that are configured to abut and engage a soft quartz light 310, and a second set of surfaces 124 that are configured to abut and engage a hard quartz light 320. The first set of surfaces 122 may comprise a first set of stop limit protrusions 122 that extend radially inwardly from the inner surface 126. For example, as shown in FIG. 4, the first set of surfaces 122 may comprise four stop limit protrusions 122. The second set of surfaces 124 may comprise a second set of stop limit protrusions 124 that also extend radially inwardly from the inner surface 126. For example, as shown in FIG. 4, the second set of surfaces 124 may comprise two stop limit protrusions 124. The first set of stop limit protrusions 122 may have a different axial position than the second set of stop limit protrusions 124. For example, the first set of stop limit protrusions 122 may be disposed at a more shallow position within the front socket portion 110 such that a cylinder inserted within the front socket portion 110 may engage the first set of stop limit protrusions 122 before reaching the second set of stop limit protrusions 124.

As illustrated in FIG. 5, a mounting base 200 according to an exemplary embodiment may comprise an axial base portion 210 and a radial member 220. In one aspect, the axial base portion 210 may comprise a substantially cylindrical shape having a substantially circular cross-section, while in other embodiments, the axial base portion 210 may comprise an alternative cross-sectional shape such as an oval cross-sectional shape, a rectangular cross-sectional shape, a triangular cross-sectional shape, or other cross-sectional shapes as may be envisioned by those of skill in the art. The axial base portion 210 may comprise an inner surface 214 that defines a hollow receiving space that is sized and shaped to receive either of the first socket portion 110 or the second socket portion 130. As will be discussed in greater detail below with reference to FIGS. 13, and 14, the hollow receiving space may comprise a hollow passage through which a portion of a light 300 may be inserted.

The axial base portion 210 may further comprise a first base engagement structure 212 which may comprise a set of one or more slots. The first base engagement structure 212 may be sized and shaped to releasably engage either of the front engagement structure 112 or the rear engagement structure 132 of the socket 100. Thus, the first base engagement structure 212 may comprise a complementary engagement structure that is complementary to both the front engagement structure 112 and the rear engagement structure 132. In one embodiment, the first base engagement structure 212 comprises at least one slot, and the front engagement structure 112 and the rear engagement structure 132 each comprise at least one protrusion that is configured to engage the at least one slot. In another embodiment, the protrusions and slots may be inverted, such that the first base engagement structure 212 comprises at least one protrusion, and the front engagement structure 112 and the rear engagement structure 132 each comprise at least one slot that is configured to engage the at least one protrusion. Each of the first base engagement structure 212, the front engagement structure 112, and the rear engagement structure 132 may comprise a quick release connector which may engage another quick release connector simply by contact, insertion, and/or rotation.

The axial base portion 210 may further comprise an end surface 216 that is disposed axially opposite the base radial member 220. The base 200 and socket 100 may be sized and shaped such that when the front engagement structure 112 is releasably engaged to the first base engagement structure 212, the end surface 216 may abut the front surface 154 of the flange. Likewise, when the rear engagement structure 132 is releasably engaged to the first base engagement structure 212, the end surface 216 may abut the rear surface 158 of the flange. In this manner, the flange 150 and the end surface 216 may act as depth stops that limit the extent to which the socket 100 may be inserted relative to the base 200.

The base radial member 220 may extend radially outwardly in a plane perpendicular to the longitudinal axis of the mounting base 200. The radial member 220 may comprise a second base engagement structure 222 which may comprise a set of one or more holes that are arranged to receive screws therethrough. As illustrated in FIG. 5, the radial member 220 may comprise four screw holes spaced at substantially equal intervals of 90 degrees about the radial member 220.

Figure 6:
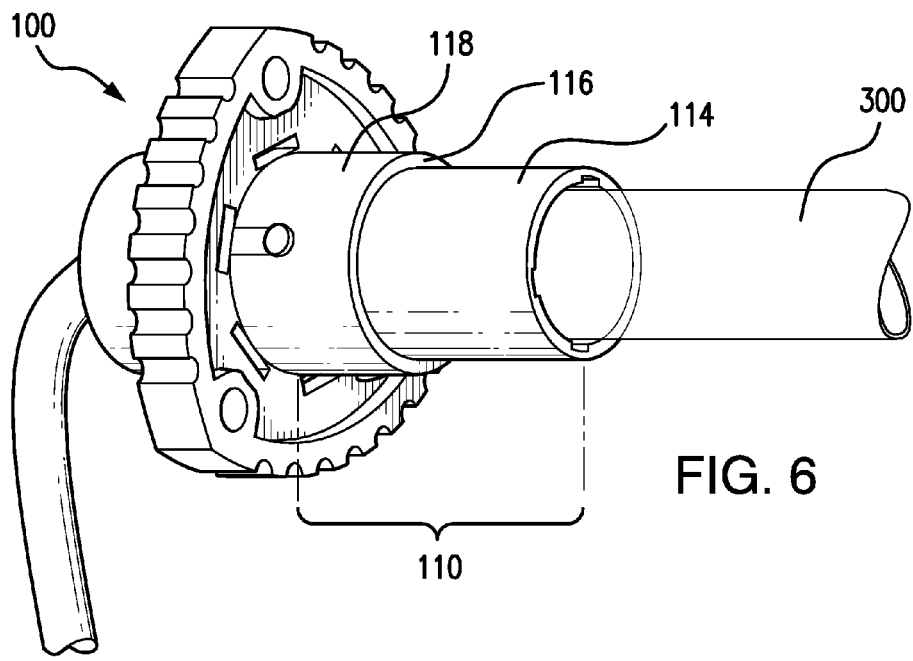
FIG. 6 illustrates an exemplary configuration wherein a light is engaged to a socket.
Figure 7:
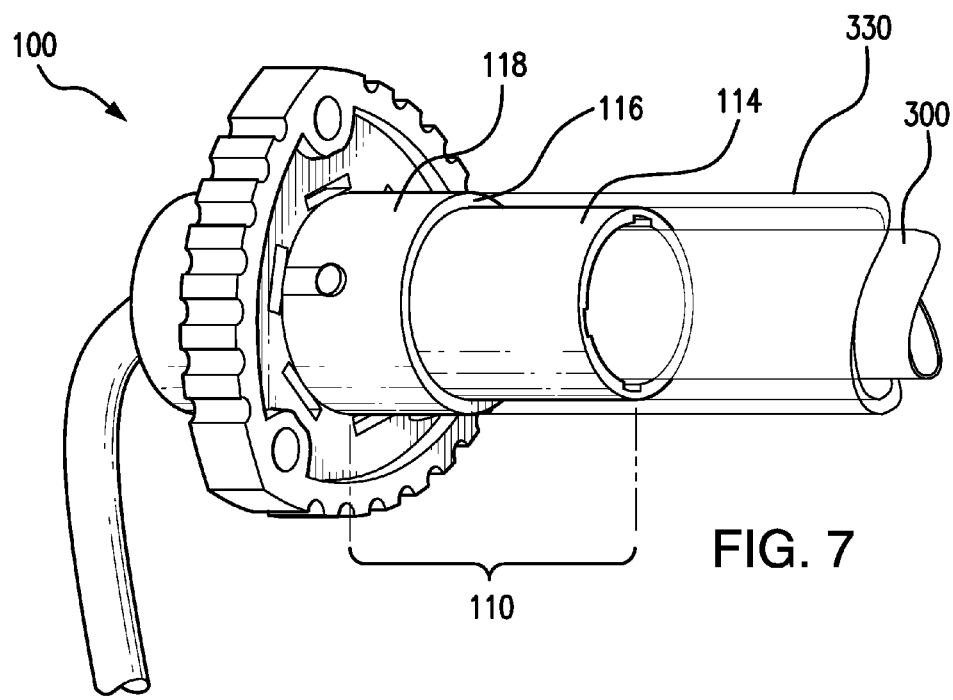
FIG. 7 illustrates an exemplary configuration wherein a light having a light jacket is engaged to a socket.

As illustrated in FIGS. 6 and 7, a light 300 may be received by the first socket portion 110 and coupled to the socket 100. The light 300 may comprise an elongate body having an outer diameter. A light jacket 330 may be provided such that the jacket 330 surrounds the exterior of the elongate body of the light 300. In some embodiments, the light 300 may be coupled to the socket 100 prior to installation, and the light 300 and socket 100 may be a single unit separate from the mounting base 200 and/or bracket 400. When the light 300 and socket 100 form a separate unit, the light/socket unit may be easily replaced and a new unit may be easily installed and/or removed from a statically mounted base 200.

Figure 8:
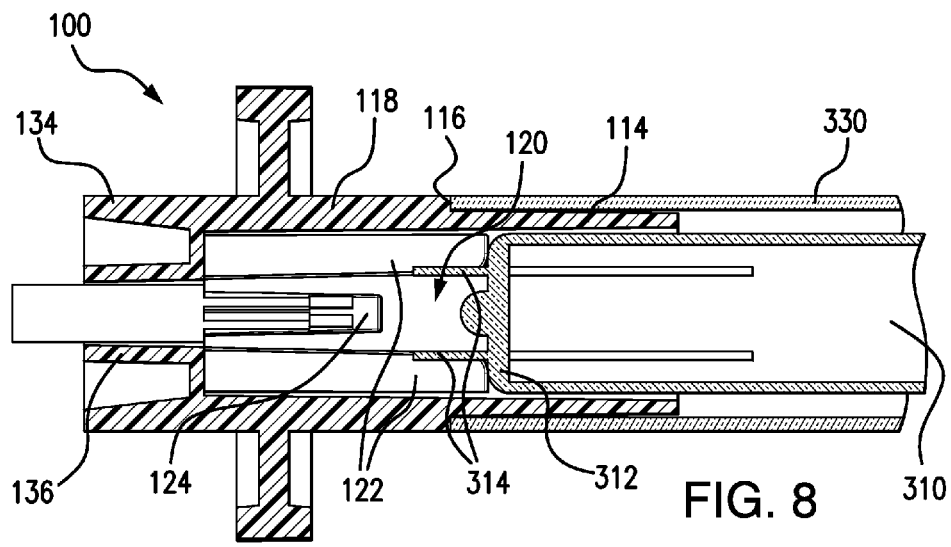
FIG. 8 illustrates a cutaway view of an exemplary configuration wherein a soft quartz light and light jacket are engaged with a socket.
Figure 9:
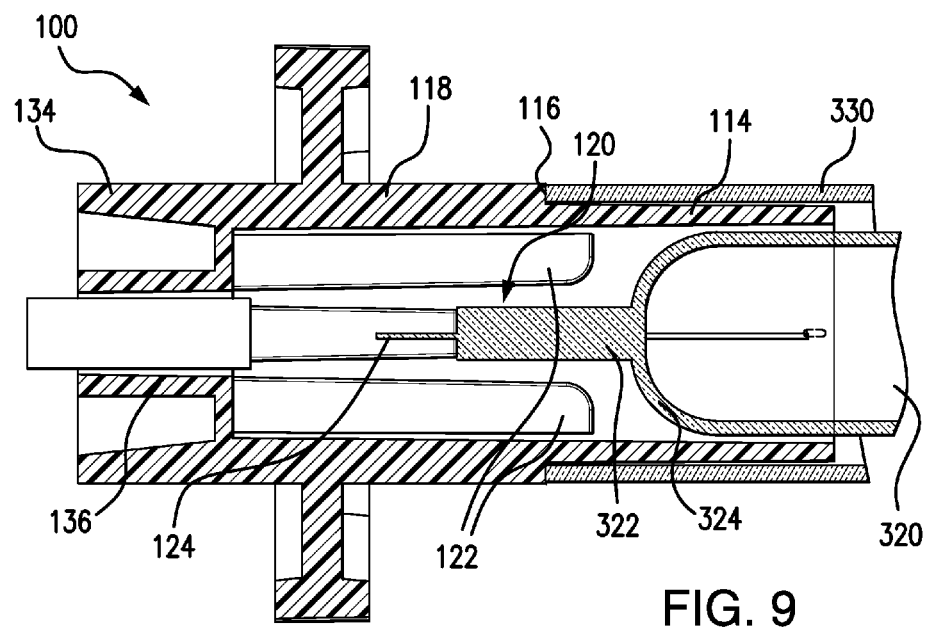
FIG. 9 illustrates a cutaway view of an exemplary configuration wherein a hard quartz light and light jacket are engaged with a socket.

As illustrated in FIGS. 7-9, a light jacket 330 may comprise a tube having an outer diameter that is substantially equal to the outer diameter of the second axial portion 118 of the first socket portion 110. The jacket 330 may be coupled to the light 300, and the inner diameter of the jacket 330 may be substantially equal to the outer diameter of the first axial portion 114. Thus, the jacket 330 may be slid over the first axial portion 114 such that an end surface of the jacket 330 abuts and engages the transverse surface 116 of the first socket portion, thereby forming a substantially continuous outer surface between the second axial portion 118 and the outer surface of the jacket 330.

FIGS. 8 and 9 illustrate exemplary engagement configurations between the light retention structure 120 and complementary retention structures on two types of lights 310 and 320. As illustrated in FIG. 8, a light 310 may be a first light type, which may be, for example, a soft quartz light. The first light type 310 may comprise an elongate body, shoulders 312, and a pair of axial extensions 314. An outer diameter of the elongate body of the first light type 310 may be substantially equal to the inner diameter of the first axial portion 114 of the socket 100, and the axial extensions 314 may be spaced by a predetermined distance. In an assembled configuration, the shoulders 312 may engage the first set of stop limit protrusions 122 of the light retention structure 120. At the same time, the outer surface of the elongate body of the first light type 310 may engage the inner surface of the of the first axial portion 114, the axial extensions 314 may engage the inner surfaces of the stop limit protrusions, and the end surface of the light jacket 330 may engage the transverse surface 116 defined between the first axial portion 114 and the second axial portion 118.

As illustrated in FIG. 9, a light 320 may alternatively be a second light type, which may be, for example, a hard quartz light. The second light type 320 may comprise an elongate body, shoulders 324, and an axial protrusion 322. An outer diameter of the elongate body of the second light type 320 may be substantially equal to the inner diameter of the first axial portion 114 of the socket 100, and the axial protrusion 322 may have a predetermined length. In an assembled configuration, the axial protrusion 322 may engage the second set of stop limit protrusions 124 of the light retention structure 120. At the same time, the outer surface of the elongate body of the second light type 320 may engage the inner surface of the of the first axial portion 114, and the end surface of the light jacket 330 may engage the transverse surface 116 defined between the first axial portion 114 and the second axial portion 118. In this assembled configuration, the shoulders 324 may optionally not abut the first set of stop limit protrusions 122 of the light retention structure 120.

Relative to a soft quartz light 310, a hard quartz light 320 may comprise a thicker casing, and may provide a longer useful life as well as a broader output spectrum of UV wavelengths. A soft quartz light 310, by contrast, may be less expensive to manufacture, and may therefore be more suitable for cost-sensitive applications.

Figure 10:
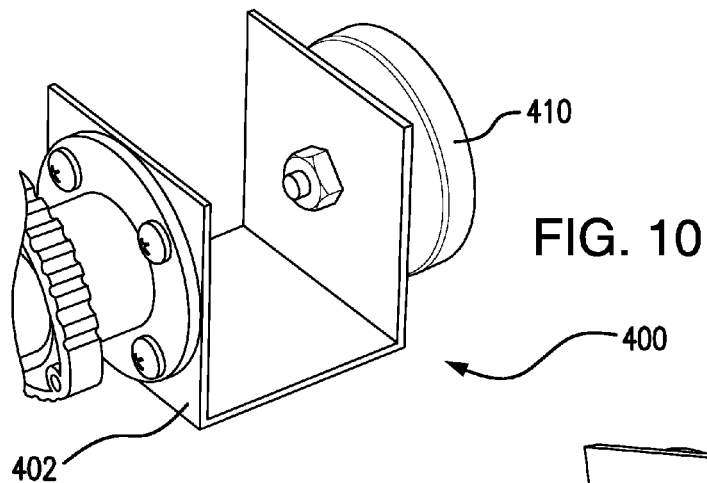
FIG. 10 illustrates an exemplary bracket comprising a mounting magnet.
Figure 11:
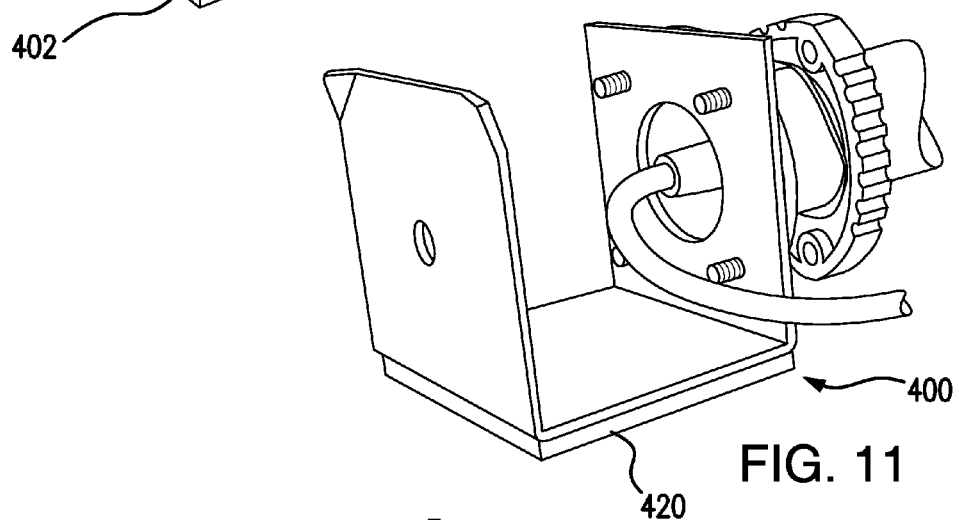
FIG. 11 illustrates an exemplary bracket comprising a double-sided adhesive tape pad.
Figure 12:
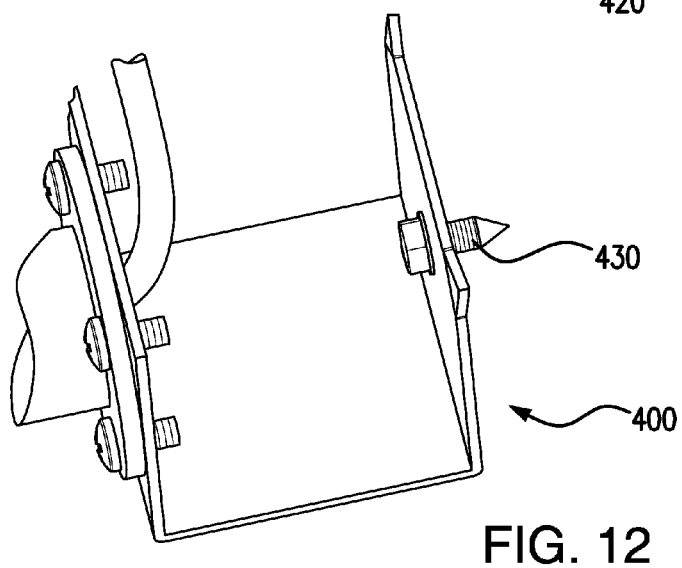
FIG. 12 illustrates an exemplary bracket comprising a mounting screw.

FIGS. 10-12 illustrate mounting brackets 400 according to exemplary embodiments. In some embodiments, the bracket 400 may comprise a U-shaped bracket. The bracket 400 may comprise at least one substantially planar mounting surface 402 to which the base 200 may be affixed via the second base engagement structure 222. The bracket may further comprise a second surface to which a bracket coupling member may be attached. The bracket coupling member may optionally comprise a magnet 410, a tape pad 420 which may comprise a double-sided tape pad 420 having at least two adhesive surfaces, or a screw 430 which may comprise a self-tapping screw 430. In another embodiment, an adhesive may be disposed directly on a surface of the bracket 400 such that an adhesive surface is provided on the bracket 400.

FIGS. 13-18 depict methods and configurations for installing lamps according to exemplary embodiments.

Figure 18:
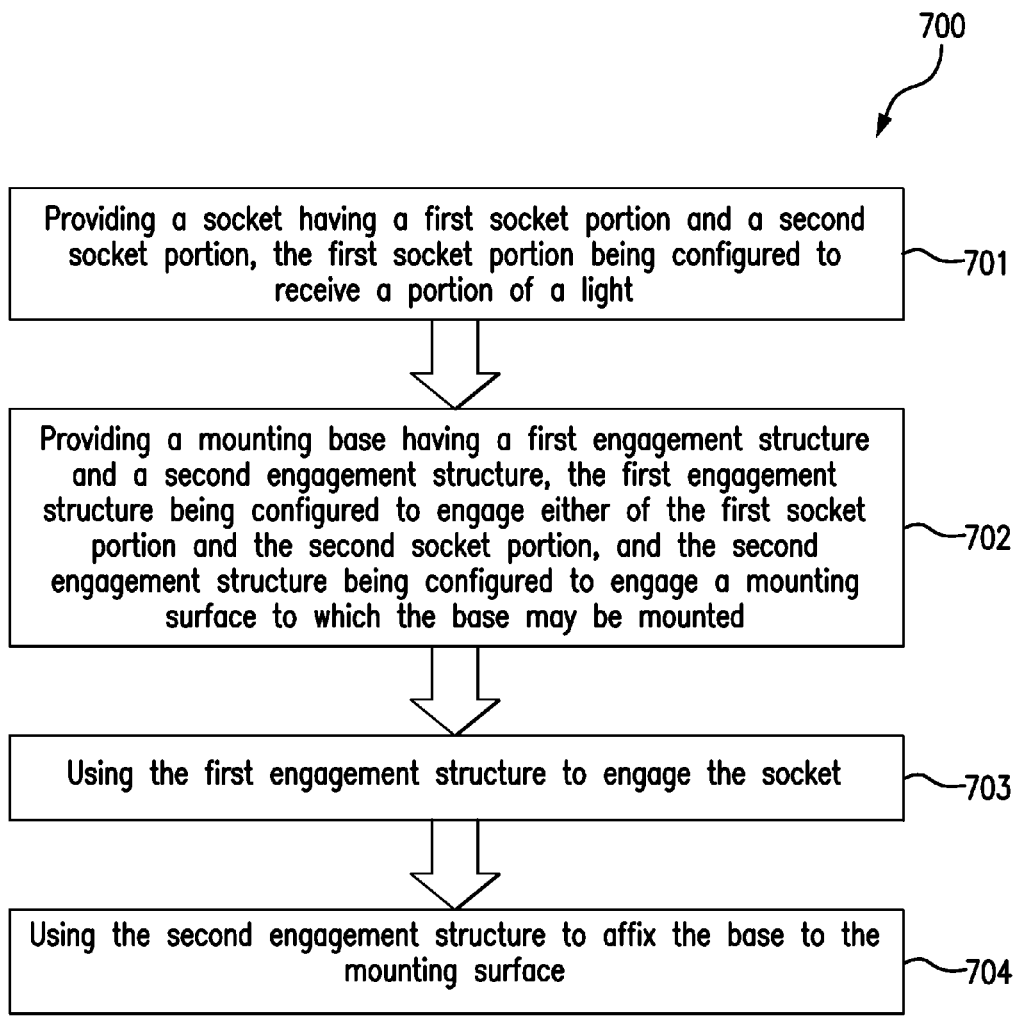
FIG. 18 illustrates exemplary method steps for installing a lamp.

FIG. 18 illustrates steps for an exemplary method 700 for installing a lamp 10. As shown in step 701, a method may comprise providing a socket having a first socket portion and a second socket portion, the first socket portion being configured to receive a portion of a light. For example, a socket 100 may be provided, wherein the first socket portion may comprise a front socket portion 110 and the second socket portion may comprise a rear socket portion 120 as illustrated in FIGS. 3 and 4. In some embodiments, step 701 may further comprise providing a light that is coupled to the first socket portion. For example, a light 300 may be coupled to a front socket portion 110 via a retention structure 120 as illustrated in FIGS. 6-9.

As shown in step 702, an exemplary method may further comprise providing a mounting base having a first engagement structure and a second engagement structure, the first engagement structure being configured to engage either of the first socket portion and the second socket portion, and the second engagement structure being configured to engage a mounting surface to which the base may be mounted. For example, a mounting base 200 may be provided, wherein the first engagement structure may comprise a first base engagement structure 212, and the second engagement structure may comprise a second base engagement structure 212 as illustrated in FIG. 5. The second base engagement structure 212 may be configured to engage a mounting surface such as a surface of an HVAC unit 600 or a mounting surface of a bracket 400.

As shown in step 703, an exemplary method may further comprise using the first engagement structure to engage the socket. For example, the first base engagement 212 may be used to engage a socket 100 by inserting the either the front socket portion 110 or the second rear portion 130 into the base 200 and rotating the socket 100 relative to the base 200 such that the socket 100 may be releasably engaged by the first base engagement structure 212. As shown in step 704, an exemplary method may further comprise using the second engagement structure to affix the base to the mounting surface. For example, the second base engagement structure 222 may be affixed and engaged to a mounting surface such as a mounting surface 402 of a bracket 400 or an internal or external surface 610, 620 of an HVAC unit 600.

As illustrated in FIGS. 13 and 14, an installation method 700 may be used to achieve a first exemplary external installation configuration. In a first external installation configuration, a hole may be drilled through an external surface 610 of an HVAC unit 600, and a mounting base 200 may be positioned over the hole and affixed to an external surface 610 of the HVAC unit via the second base engagement structure 222. Exemplary step 701 may additionally comprise providing a third engagement structure disposed on the first socket portion and providing a fourth engagement structure disposed on the second socket portion. For example, the third engagement structure may comprise a front engagement structure 112 disposed on a front socket portion 110, and the fourth engagement structure may comprise a rear engagement structure 132 disposed on a rear socket portion 130 as illustrated in FIG. 3. Step 703 may additionally comprise using the first engagement structure to engage either of the third engagement structure and the fourth engagement structure. For example, in a first external installation configuration such as that shown in FIGS. 13 and 14, the first base engagement structure 212 may be used to engage the front engagement structure 112 of the socket 100. This may be achieved by inserting the front socket portion 110 within the axial base portion 210 and rotating the socket 100 relative to the base 200 such that the front engagement structure 112 engages the first base engagement structure 212.

An exemplary method may further comprise inserting a light through an opening in the base such that the third engagement structure on the socket engages the first engagement structure on the base. For example, a light 300 may be inserted through the hollow passage of the mounting base 200 until the front engagement structure 112 of the socket 100 engages the first base engagement structure 212 as illustrated in FIG. 14. In this configuration, the elongate body of the first socket portion 110 (and in particular, the second axial portion 118) may have an outer diameter that is substantially equal to an inner diameter of the receiving space of the axial base portion 210 such that the elongate body of the first socket portion 110 may tightly engage the inner surface 214 of the axial base portion 210, thereby forming an air- and water-tight seal between the socket 100 and the base 200.

During installation, a sealing flange 502 may be provided between the base 200 and the external surface 610 of the HVAC unit 600. The sealing flange 502 may comprise a silicone or polytetrafluoroethylene (PTFE) member, and may help to ensure that an air- and water-tight seal is provided between the base 200 and the external surface 610 of the HVAC unit 600. Additionally, a washer 504 may be provided between the socket 100 and the base 200. The washer 504 may comprise a wave washer 504 which may comprise, for example, a stainless steel material. Alternatively, the washer 504 may comprise a sponge washer 504 which may comprise, for example, an expanded silicone material. Providing either of a wave washer 504 or a sponge washer 504 may help to ensure lamp locking tension, thereby improving the engagement between the socket 100 and the base 200, and supporting the provision of an air- and water-tight seal between the socket 100, light 300 and base 200.

Figure 15:
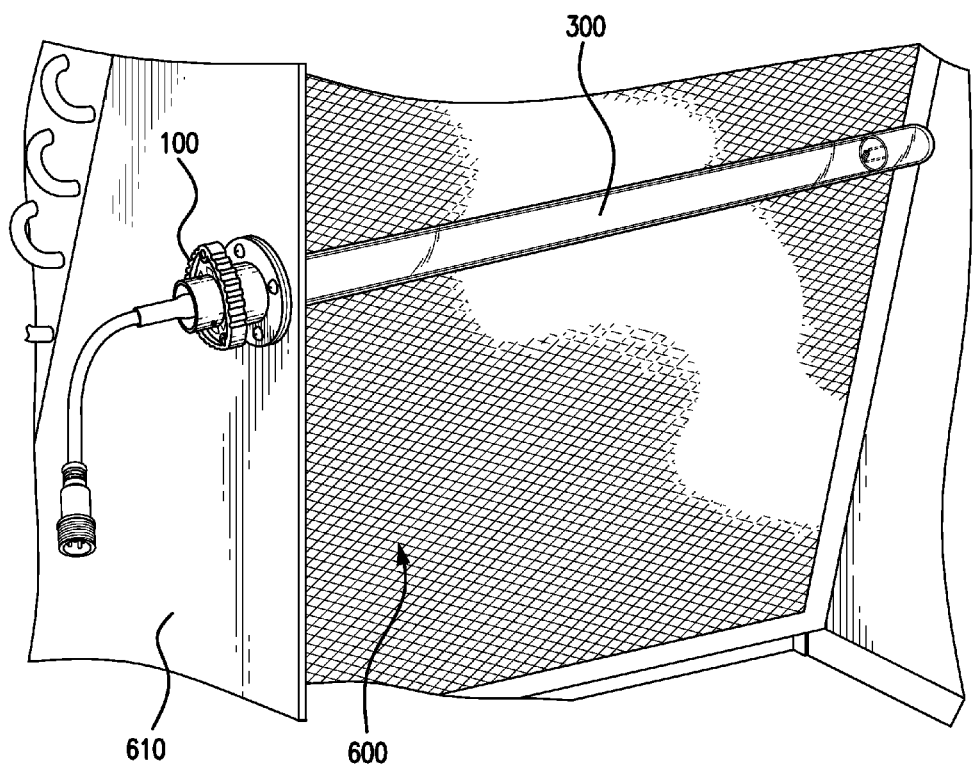
FIG. 15 illustrates a second exemplary installation configuration wherein a socket is mounted directly to a surface of an HVAC unit.

As illustrated in FIG. 15, an installation method 700 may also be used to achieve a second exemplary external installation configuration. In an installation configuration as shown in FIG. 15, step 702 may be skipped such that a mounting base need not be provided, and a socket may be mounted directly to a surface of an HVAC unit. According to this second external installation configuration, a hole may be drilled through an external surface 610 of an HVAC unit 600. Step 701 may additionally comprise providing a socket having a first engagement structure disposed on a first socket portion, a second engagement structure disposed on a second socket portion, and a third engagement structure disposed on a radial flange. For example, the first engagement structure may comprise a front engagement structure 112, the second engagement structure may comprise a rear engagement structure 132, and the third engagement structure may comprise a flange engagement structure 152 as illustrated in FIG. 3.

An exemplary method may further comprise inserting the light through an opening in an HVAC unit such that the flange abuts an external surface of the HVAC unit. For example, the light 300 may be inserted through a hole in an external surface 610 of an HVAC unit 600 until the flange 150 contacts the external surface 610 as illustrated in FIG. 15. An exemplary method may further comprise using the third engagement structure to affix the socket to an external surface of an HVAC unit. For example, the flange engagement structure 152 may comprise a set of one or more holes, and screws may be threaded through the holes to affix the socket 100 to the external surface 610 of the HVAC unit 600 as illustrated in FIG. 15. In this manner, a unit comprising a socket 100 and a light 300 may optionally be externally mounted to an HVAC unit without the use of a base 200 or a bracket 400. In this configuration, a sealing flange 502 may be provided between a socket flange 150 and an external surface 610 of an HVAC unit 600 in a similar manner as described above with respect to FIGS. 13 and 14.

Figure 16:
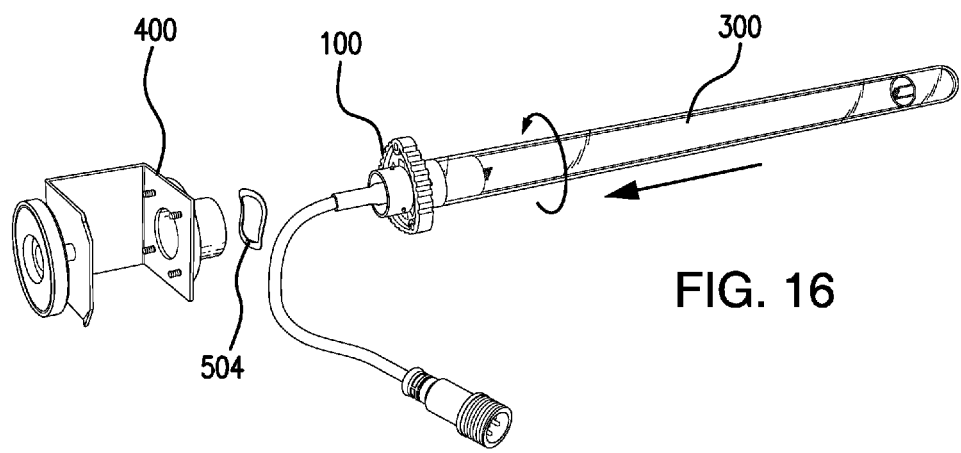
FIG. 16 illustrates a third exemplary installation configuration wherein a light is being inserted into a base from a second direction.
Figure 17:
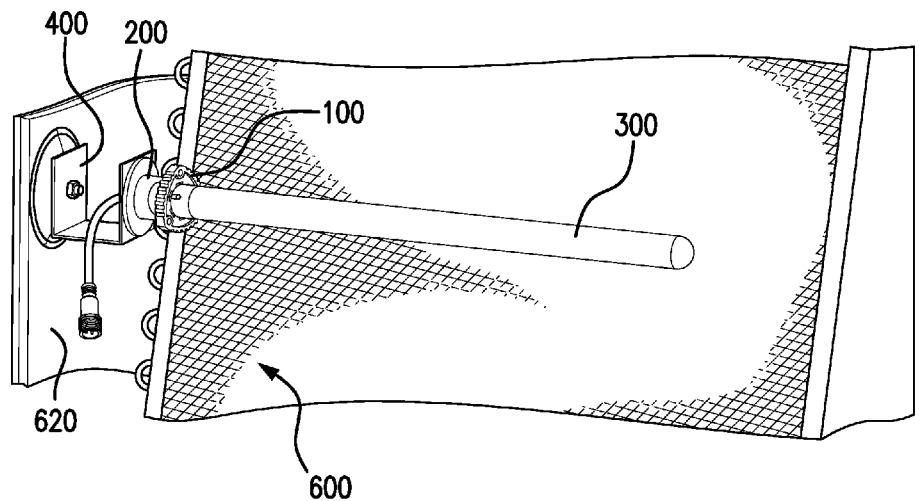
FIG. 17 illustrates the third exemplary installation configuration of FIG. 16, wherein the light has been inserted into the base from the second direction, the base is mounted to a surface of a bracket, and the bracket is mounted to a surface of an HVAC unit.

As illustrated in FIGS. 16 and 17, an installation method 700 may also be used to achieve an exemplary internal installation configuration. Step 701 may additionally comprise providing a socket having a third engagement structure disposed on a first socket portion and a fourth engagement structure disposed on a second socket portion. For example, the third engagement structure may comprise a front engagement structure 112 disposed on a front socket portion 110, and the fourth engagement structure may comprise a rear engagement structure 132 disposed on a rear socket portion 130 as illustrated in FIG. 3. Step 703 may additionally comprise using the first engagement structure to engage either of the third engagement structure and the fourth engagement structure. For example, in an internal installation configuration such as that shown in FIGS. 16 and 17, the first base engagement structure 212 may be used to engage the rear engagement structure 132 of the socket 100. This may be achieved by inserting the rear socket portion 130 within the axial base portion 210 and rotating the socket 100 relative to the base 200 such that the rear engagement structure 132 engages the first base engagement structure 212. Step 704 may further comprise using the second engagement structure to affix the base to a mounting surface of a bracket. For example, the second base engagement structure 222 may be affixed to a mounting surface 402 of a bracket 400, which may comprise a U-shaped bracket 400 as illustrated in FIGS. 10-12 and 17.

An exemplary method may further comprise coupling the bracket to a surface of an HVAC unit. For example, the bracket 400 may be coupled to an internal surface 620 of an HVAC unit 600 via a bracket coupling member as illustrated in FIG. 17. In one embodiment, the method may further comprise engaging the fourth engagement structure to the first engagement structure, thereby releasably coupling the light to the mounting surface via the socket and mounting base. For example, the rear engagement structure 132 of the socket 100 may be releasably engaged to the first base engagement structure 212 of the base 200, thereby releasably coupling the light 300 to the mounting surface 402 via the socket 100 and the mounting base 200 as illustrated in FIG. 17. The socket 100 and light 300 may be rotated relative to the base 200 to thereby engage the rear engagement structure 132 with the first base engagement structure 212.

Additionally, in an exemplary internal installation configuration, a washer 504 may be provided between the socket 100 and the base 200. The washer 504 may comprise a wave washer 504 which may comprise, for example, a stainless steel material. Alternatively, the washer 504 may comprise a sponge washer 504 which may comprise, for example, an expanded silicone material. Providing either of a wave washer 504 or a sponge washer 504 may help to ensure lamp locking tension, thereby improving the engagement between the socket 100 and the base 200, and supporting an air- and water-tight seal between the socket 100, light 300 and base 200.

In accordance with above exemplary installation embodiments, the socket 100 and light 300 may be disengaged from the base 200 and uninstalled by simply rotating the socket 100 and light 300 in a direction opposite the installation direction, and withdrawing the socket 100 from the base 200. Thereafter, the light 300 may be replaced by installing a new light 300 that is coupled to a new socket 100.

The devices and methods described herein provide numerous advantages. Due to the quick release mounting assembly, a user may quickly install, remove, or replace a light by hand, and with or without the use of tools. This is particularly advantageous since UV lights expire over time and must be replaced in order to continue germicidal treatment of static HVAC surfaces and moving air. Additionally, a socket can be installed such that either a front socket portion or a rear socket portion engages a mounting base. This enables quick release installation configurations in both internal and external mountings. Thus, the benefits of having a quick release mounting assembly can be realized in any HVAC system, notwithstanding any space or design constraints that may be imposed.

Furthermore, some embodiments may cost-effectively provide completely air- and water-tight seals between the installed lamp and a surface of an HVAC, thereby improving air quality and energy efficiency. Such air- and water-tight seals are particularly advantageous when the lamp is installed through a hole drilled in an external surface of the HVAC unit. Moreover, relative to a Z-shaped mounting bracket, the U-shaped bracket provided in some embodiments axially aligns the mass of the lamp with the portion of the HVAC unit to which the lamp is affixed. This allows the lamp to be assembled within more narrow spaces and improves the strength of the mounting assembly as installed within the wind stream of the HVAC unit.

The mounting assembly may be configured to accept both soft quartz lights and hard quartz lights. Hard quartz lights may advantageously provide a long life as well as a broad output spectrum of UV wavelengths. Soft quartz lights, meanwhile, may be less expensive to manufacture, and may therefore be more suitable for cost-sensitive applications. Thus, a single mounting assembly design can be used for either type of light and may therefore be useful for both lower end and higher end applications.

The socket may be configured to accept and seal a light jacket that may comprise a quartz jacket tube, polypropylene carbonate (PPC) sleeve, or a tube formed of other materials. The jacket may advantageously insulate the light in cold air environments, thereby offering higher UV outputs and enhancing the life of the light. Additionally, jacket materials such as PPC offer a non-polar surface which resists fouling, thereby presenting an effectively self-cleaning surface that further enhances air quality.

The socket may comprise a wire exit tube that is configured to include or receive a shrink tube. This may advantageously enable a sleeve that covers the wiring to be shrink tube sealed directly into the molded exit tube of the socket, thereby providing a water- and air-tight seal, while also acting as a wire keeper that prevents the wires from being pulled out of the lamp assembly in the event that a force is unintentionally applied to the wires.

The mounting components may be made from UV and oxidative-resistant, UL V090 rated (highest possible burn rating for plastic) materials, such as semi-crystalline polybutylene terephthalate (PBT) and/or polyethylene terephthalate (PET) materials including glass filled Valox™ or other similar materials. Accordingly, components of the lamp assembled according to some embodiments will not burn, and may be safely used in high-voltage electrical applications.

The advantages described above are not exhaustive, and are merely exemplary descriptions of certain benefits that may be achieved by utilizing devices and methods according to the present disclosure. These and other advantages of the disclosed devices and methods will be apparent to those skilled in the art given the disclosure provided herein.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the methods described above and illustrated in the drawings are shown as a sequence of steps, this was done solely for the sake of illustration. Accordingly, it is contemplated that some steps may be added, some steps may be omitted, the order of steps may be re-arranged, and some steps may be performed in parallel.

The invention claimed is:

1. A lamp comprising:
    a mounting assembly for mounting a light, the mounting assembly comprising:
        a socket having a first socket portion and a second socket portion, the first socket portion being configured to receive a portion of a light;
        a mounting base having a first engagement structure and a second engagement structure, the first engagement structure being configured to engage either of the first socket portion and the second socket portion, and the second engagement structure being configured to engage a surface to which the base may be mounted.

2. A lamp as recited in claim 1, further comprising:
    a third engagement structure disposed on the first socket portion;
    a fourth engagement structure disposed on the second socket portion;
    wherein the first engagement structure is configured to engage either of the third engagement structure and the fourth engagement structure.

3. A lamp as recited in claim 2, wherein the first engagement structure comprises a quick release connector, and the quick release connector is configured to releasably engage either of the third engagement structure and the fourth engagement structure.

4. A lamp as recited in claim 2, wherein the first engagement structure comprises at least one slot.

5. A lamp as recited in claim 4, wherein the third engagement structure comprises at least one protrusion that is configured to engage the at least one slot, and the fourth engagement structure comprises at least one protrusion that is configured to engage the at least one slot.

6. A lamp as recited in claim 2, wherein the first engagement structure comprises at least one protrusion.

7. A lamp as recited in claim 6, wherein the third engagement structure comprises at least one slot that is configured to engage the at least one protrusion, and the fourth engagement structure comprises at least one slot that is configured to engage the at least one protrusion.

8. A lamp as recited in claim 1, wherein the first socket portion comprises a light retention structure configured to engage a light, the light retention structure comprising a first set of surfaces.

9. A lamp as recited in claim 8, wherein the first set of surfaces is configured to engage a first light type, the light retention structure further comprising a second set of surfaces configured to engage a second light type.

10. A lamp as recited in claim 9, wherein the first light type comprises a soft quartz light and the second light type comprises a hard quartz light.

11. A lamp as recited in claim 8, further comprising a light.

12. A lamp as recited in claim 11, wherein the light comprises an elongate body, and the mounting base comprises an opening sized to receive at least a portion of said elongate body.

13. A lamp as recited in claim 8, wherein the first socket portion comprises a first axial portion, a second axial portion, and a transverse surface dividing said first and second axial portions.

14. A lamp as recited in claim 13, further comprising a light and a light jacket, said light jacket being configured to engage said transverse surface when said light engages said light retention structure.

15. A lamp as recited in claim 2, further comprising a U-shaped bracket, wherein said second engagement structure is engaged to said U-shaped bracket.

16. A lamp as recited in claim 15, wherein said U-shaped bracket is coupled to a mounting magnet.

17. A lamp as recited in claim 15, wherein said U-shaped bracket has an adhesive surface provided thereon.

18. A lamp as recited in claim 15, wherein said U-shaped bracket comprises at least one hole through which a screw may be placed to mount the bracket to a surface of an HVAC unit.

19. A lamp as recited in claim 2, further comprising a fifth engagement structure disposed on the socket, the fifth engagement structure being configured to engage a surface to which the socket may be mounted.

20. A lamp are recited in claim 19, wherein the fifth engagement structure comprises at least one hole through which a screw may be placed to mount the socket to a surface of an HVAC unit.

21. A lamp as recited in claim 11, wherein the first socket portion comprises an elongate body having an outer diameter and the mounting base comprises an opening having an inner diameter that substantially corresponds to the outer diameter of the first socket portion, such that an outer surface of the first socket portion is configured to engage an inner surface of the opening to thereby produce a substantially water-tight engagement.

22. A lamp as recited in claim 21, further comprising a washer, wherein the washer is positioned between the mounting base and the socket to produce a substantially water-tight engagement between the mounting base and the socket.

23. A lamp comprising:
    a socket having a first socket portion and a second socket portion, the first socket portion being configured to receive a portion of a light;
    a first engagement structure disposed on the first socket portion, the first engagement structure being configured to engage a mounting base; and
    a second engagement structure disposed on the second socket portion, the second engagement structure being configured to engage a mounting base.

24. A lamp as recited in claim 23, wherein a radial flange is disposed between the first and second socket portions.

25. A lamp as recited in claim 24, further comprising a light, wherein at least portion of the light is received by the first socket portion.

26. A lamp as recited in claim 24, wherein the first and second engagement structures are equivalent engagement structures such that the socket is configured to engage a single mounting base from either of a first direction and a second direction axially opposite the first direction.

27. A lamp as recited in claim 26, wherein the radial flange has a first surface and a second surface opposite the first surface, such that the first surface is configured to abut a portion of a mounting base when the first engagement structure is engaged to a mounting base, and the second surface is configured to abut the portion of a mounting base when the second engagement structure is engaged to the mounting base.

28. A lamp as recited in claim 23, wherein the first and second engagement structures comprise quick release connectors, and the first and second engagement structures are configured to engage a complementary engagement structure on a mounting base.

29. A lamp as recited in claim 23, wherein a radial flange is disposed between the first and second socket portions, and the first and second engagement structures each comprise at least one protrusion that is configured to engage a complementary slot on a mounting base.

30. A lamp as recited in claim 23, wherein a radial flange is disposed between the first and second socket portions, and the first and second engagement structures each comprise at least one slot that is configured to engage a complementary protrusion on a mounting base.

31. A lamp as recited in claim 23, wherein the first socket portion comprises a light retention structure comprising a first set of surfaces, the light retention structure being configured to engage a light.

32. A lamp as recited in claim 31, wherein the first set of surfaces is configured to engage a first light type, and the light retention structure further comprises a second set of surfaces configured to engage a second light type.

33. A lamp as recited in claim 32, wherein the first light type comprises a soft quartz light and the second light type comprises a hard quartz light.

34. A lamp as recited in claim 31, further comprising a light, wherein the light comprises an elongate body having a first end and a second end opposite the first end, and the light retention structure is configured to engage a complementary structure disposed on the first end of said light.

35. A lamp as recited in claim 23, further comprising a third engagement structure disposed on a radial flange of the socket, the third engagement structure being configured to engage a surface of an HVAC unit.

36. A lamp as recited in claim 35, wherein the third engagement structure comprises at least one hole through which a screw may be placed to mount the socket to a surface of an HVAC unit.

37. A lamp as recited in claim 23, wherein the first socket portion comprises a first axial portion, a second axial portion, and a transverse surface dividing said first and second axial portions.

38. A lamp as recited in claim 37, further comprising a light coupled to a light jacket, said light jacket being configured to engage said transverse surface when said light engages a light retention structure disposed on the first socket portion.

39. A method for mounting a light, the method comprising:
providing a socket having a first socket portion and a second socket portion, the first socket portion being configured to receive a portion of the light;
providing a mounting base having a first engagement structure and a second engagement structure, the first engagement structure being configured to engage either of the first socket portion and the second socket portion, and the second engagement structure being configured to engage a mounting surface to which the base may be mounted;
using the first engagement structure to engage the socket; and
using the second engagement structure to affix the base to the mounting surface.

40. A method as recited in claim 39, the method further comprising:
providing a third engagement structure disposed on the first socket portion;
providing a fourth engagement structure disposed on the second socket portion; and
using the first engagement structure to engage either of the third engagement structure and the fourth engagement structure.

41. A method as recited in claim 40, wherein the first engagement structure comprises a quick release connector, and the quick release connector is configured to releasably engage either of the third engagement structure and the fourth engagement structure.

42. A method as recited in claim 40, wherein the first socket portion comprises a light retention structure, the light retention structure comprising a first set of surfaces.

43. A method as recited in claim 42, wherein the first set of surfaces is configured to engage a first light type, the light retention structure further comprising a second set of surfaces configured to engage a second light type.

44. A method as recited in claim 43, wherein the first light type comprises a soft quartz light and the second light type comprises a hard quartz light.

45. A method as recited in claim 42, further comprising the step of providing a light, wherein the light is coupled to the socket via the light retention structure.

46. A method as recited in claim 45, wherein the first socket portion comprises an elongate body, and the mounting base comprises an opening sized to receive at least a portion of said elongate body, the method further comprising inserting the light through the opening of the mounting base such that the third engagement structure engages the first engagement structure.

47. A method as recited in claim 46, the elongate body of the first socket portion has an outer diameter and the opening of the mounting base has an inner diameter that substantially corresponds to the outer diameter of the first socket portion, such that an outer surface of the first socket portion engages an inner surface of the opening to thereby produce a substantially water-tight engagement.

48. A method as recited in claim 46, further comprising providing a washer disposed between the socket and the mounting base, such that a substantially water-tight engagement is formed between the mounting base and the socket.

49. A method as recited in claim 45, further comprising engaging the fourth engagement structure to the first engagement structure, thereby releasably coupling the light to the mounting surface via the socket and mounting base.

50. A method as recited in claim 49, wherein the mounting surface comprises a surface of a U-shaped bracket.

51. A method as recited in claim 50, further comprising coupling the U-shaped bracket to a surface of an HVAC unit.

52. A method as recited in claim 51, wherein the U-shaped bracket is coupled to the surface of the HVAC unit via a mounting magnet.

53. A method as recited in claim 51, wherein the U-shaped bracket is coupled to the surface of the HVAC unit via an adhesive surface provided on the U-shaped bracket.

54. A method as recited in claim 51, wherein the U-shaped bracket is coupled to the surface of the HVAC unit via at least one screw extending through a hole disposed in the U-shaped bracket.

55. A method as recited in claim 45, wherein the light is coupled to a light jacket, and the light jacket abuts a transverse surface of the socket when the light is coupled to the socket via the light retention structure.

\* \* \* \* \*